US010464829B2

(12) United States Patent
Sit

(10) Patent No.: US 10,464,829 B2
(45) Date of Patent: Nov. 5, 2019

(54) GREASE INTERCEPTOR AND RESIDUE SEPARATOR FOR CATERING WASTEWATER

(71) Applicant: Ngo Suet Sit, Hong Kong (CN)

(72) Inventor: Ngo Suet Sit, Hong Kong (CN)

(*) Notice: Subject to any disclaimer, the term of this patent is extended or adjusted under 35 U.S.C. 154(b) by 0 days.

(21) Appl. No.: 15/748,177

(22) PCT Filed: Aug. 1, 2017

(86) PCT No.: PCT/IB2017/054681
§ 371 (c)(1),
(2) Date: Jan. 27, 2018

(87) PCT Pub. No.: WO2017/208218
PCT Pub. Date: Dec. 7, 2017

(65) Prior Publication Data
US 2019/0106338 A1  Apr. 11, 2019

(30) Foreign Application Priority Data
Jun. 3, 2016  (HK) .................... 16106385.2

(51) Int. Cl.
C02F 1/40  (2006.01)
E03F 5/16  (2006.01)
(Continued)

(52) U.S. Cl.
CPC ............. *C02F 1/40* (2013.01); *B01D 17/02* (2013.01); *B01D 17/0211* (2013.01);
(Continued)

(58) Field of Classification Search
CPC ............ B01D 17/0211; B01D 17/0214; B01D 21/0012; B01D 21/003; B01D 21/2438; C02F 1/40; C02F 2103/32; E03F 5/16
(Continued)

(56) References Cited

U.S. PATENT DOCUMENTS 863,168 A * 8/1907 Griswold ............. B01F 1/0022
210/521
1,612,557 A * 12/1926 Weisgerber ........ B01D 17/0211
210/540

(Continued)

FOREIGN PATENT DOCUMENTS

CN  202729907  * 2/2013
CN  105060397  * 11/2015
(Continued)

Primary Examiner — Christopher Upton
(74) Attorney, Agent, or Firm — Wayne & Ken, LLC; Tony Hom

(57) ABSTRACT

The present disclosure provides a residue and grease trap chamber for catering wastewater. It includes a grease trap main body and a main lid, wherein the main body is divided into a residue trap chamber, a first grease trap chamber, a second grease trap chamber and a third grease trap chamber and a residue bucket is provided within the residue trap chamber. The present disclosure has the following functions and technical features: the residue trap chamber and the residue bucket facilitate the separation of food residue in the sink; the residue discharge pipes and the three grease trap chambers are convenient for discharging residues from the chamber; the grease scrapers are convenient for removing grease intercepted in water surface. The grease interception efficiency of the system is improved compared with traditional grease traps; the structure is simple, and it is easy to mount and operate.

4 Claims, 4 Drawing Sheets

(51) Int. Cl.
*B01D 21/00* (2006.01)
*B01D 17/02* (2006.01)
*C02F 103/32* (2006.01)
*C02F 101/32* (2006.01)

(52) U.S. Cl.
CPC ....... *B01D 17/0214* (2013.01); *B01D 21/003* (2013.01); *B01D 21/0012* (2013.01); *E03F 5/16* (2013.01); *C02F 2101/32* (2013.01); *C02F 2103/32* (2013.01)

(58) Field of Classification Search
USPC .... 210/299, 307, 313, 521, 522, 525, 532.1, 210/533, 539, 540
See application file for complete search history.

(56) References Cited

U.S. PATENT DOCUMENTS

| | | | | |
|---|---|---|---|---|
| 1,918,742 | A * | 7/1933 | Elrod | B01D 21/18 210/525 |
| 4,268,396 | A * | 5/1981 | Lowe | B01D 17/0214 210/532.1 |
| 5,132,010 | A * | 7/1992 | Ossenkop | E03F 5/16 210/522 |
| 6,491,830 | B1 * | 12/2002 | Batten | B01D 21/0012 210/521 |
| 6,800,195 | B1 * | 10/2004 | Batten | B01D 17/0214 210/540 |
| 7,815,800 | B2 * | 10/2010 | Komatsu | B01D 21/0012 210/538 |
| 8,153,004 | B2 * | 4/2012 | Rodriguez-Jovet | B01D 17/0214 210/307 |
| 2006/0237362 | A1 * | 10/2006 | Weymouth | B01D 21/0012 210/532.1 |
| 2009/0145834 | A1 * | 6/2009 | Yang | B01D 17/0214 210/522 |

FOREIGN PATENT DOCUMENTS

| | | | |
|---|---|---|---|
| CN | 105174367 | * | 12/2015 |
| CN | 204824379 | * | 12/2015 |
| CN | 205011428 | * | 2/2016 |
| JP | 2001-17964 | * | 1/2001 |

* cited by examiner

GREASE INTERCEPTOR AND RESIDUE SEPARATOR FOR CATERING WASTEWATER

TECHNICAL FIELD

The present disclosure relates to the technical field of grease separation devices and in particular to a residue and grease trap for catering wastewater.

BACKGROUND OF THE PRESENT INVENTION

In the existing grease separation systems for catering wastewater, in the catering industry of Hong Kong, particularly in the small- or medium-scaled catering industry, horizontal-flow grease traps are generally used. However, there are only two grease trap chambers in such traps, and neither grease scrapers for removing grease in water surface nor means for separating food residue are provided. Accordingly, the grease separation efficiency is unsatisfactory, it is inconvenient and insufficient to remove grease in water surface, and it is likely to deposit food residue on the bottom of the trap. Due to no residue discharge pipe on the bottom, it is difficult and incomplete to remove residue in the trap. Consequently, the grease trap will often be blocked with foul smell. The cleanliness of the catering industry is influenced.

SUMMARY OF THE PRESENT INVENTION

To solve the above problems, the present disclosure provides a residue and grease trap for catering wastewater.

A residue and grease trap for catering wastewater is provided, comprising a grease trap main body and a removable main lid, wherein the main body is divided into a residue trap chamber, a first grease trap chamber, a second grease trap chamber and a third grease trap chamber; a residue separation mesh with water openings is provided between the residue trap chamber and the first grease trap chamber; water outlets and grease interceptors are provided between the grease trap chambers; a wastewater inlet is formed in the residue trap chamber of the main body, and a water outlet is formed in the third grease trap chamber of the main body; a removable residue bucket is provided within the residue trap chamber; a manually-operated grease scraper and a grease bucket connected to a grease discharge pipe outside a chamber are provided within each of the three grease trap chambers; a residue discharge pipe is provided on the bottom of each of the residue trap chamber and the three grease trap chambers; an air vent is formed in each of the residue trap chamber and the three grease trap chambers; a removable grease tank is provided outside the chamber; and, the main body is provided with adjustable legs.

Further, the residue separation mesh with water openings between the residue trap chamber and the first grease trap chamber is located in an upper portion of a spacer between the chambers.

Further, each of the manually-operated grease scrapers of the three grease trap chambers includes a lower grease scraper plate, a unidirectional rotating gear and a bearing.

Further, when each of the manually-operated grease scrapers of the three grease trap chambers is pulled, the lower grease scraper plate is in water surface; and, when the grease scraper is pushed, the lower grease scraper plate is above water surface.

Further, the grease buckets of the three grease trap chambers are connected to a grease discharge pipe outside a chamber, and provided with valves.

Further, the residue discharge pipes on the bottom of each of the residue trap chamber and the three grease trap chambers are provided with valves.

Further, the air vent formed on each of the residue trap chamber and the three grease trap chambers is located on the top of a backing plate of each of the chambers.

The present disclosure has the following advantages.

1. The arrangement of the residue trap chamber and the removable residue bucket is convenient for separating food residue in the chamber.

2. The arrangement of the residue discharge pipes on the bottoms of the chambers is convenient for discharging residue from the chambers.

3. The arrangement of the manually-operated grease scrapers in the three grease trap chambers is convenient for removing grease intercepted in water surface by the three grease trap chambers.

4. The arrangement of the adjustable legs on the main body is convenient for adjusting the main body to be horizontal, so as to realize the optimal grease separation and scraping effects.

5. The air vents arranged on the chambers are used for balancing pressure in and out of the chambers of the trap, to discharge gas in the chambers of the trap and ensure the normal removal of grease in water surface by the manually-operated grease scrapers.

6. Since three grease trap chambers are provided in the main body, the grease separation efficiency of the system is improved in comparison with traditional grease traps having only two grease trap chambers.

7. The structure is simple, and it is easy to mount and operate.

REFERENCE NUMERALS

Figure 1:
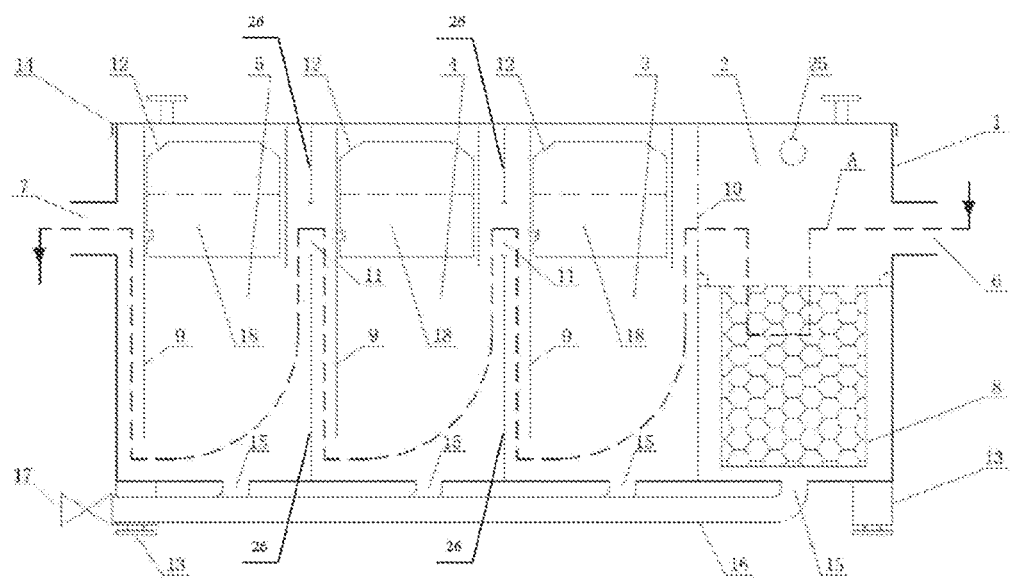
FIG. 1 is a stereoscopic sectional structure diagram of the present disclosure.

1. Main body
2. Residue trap chamber
3. First grease trap chamber
4. Second grease trap chamber
5. Third grease trap chamber
6. Wastewater inlet
7. Water outlet
8. Removable residue bucket
9. Oil interceptor
10. Residue separation mesh with water openings
11. Water opening
12. Manually-operated grease scraper
13. Adjustable leg
14. Removable lid
15. Residue discharge port
16. Residue discharge pipe
17. Residue discharge pipe
18. Lower grease scraper plate of the grease scraper 19. Unidirectional rotating gear of the grease scraper
20. Bearing of the grease scraper
21. Pull handle of the grease scraper
22. Grease bucket
23. Grease discharge pipe valve
24. Removable grease tank
25. Air vent;
26. water guiding plate
A: Stereoscopic schematic flow direction line
B: Planar schematic flow direction line

DETAILED DESCRIPTION OF THE PRESENT INVENTION

To make the objectives, technical solutions and operations of the present invention clearer, the present invention will be further described below in details by embodiments with reference to the accompanying drawings.

Embodiment 1

Figure 2:
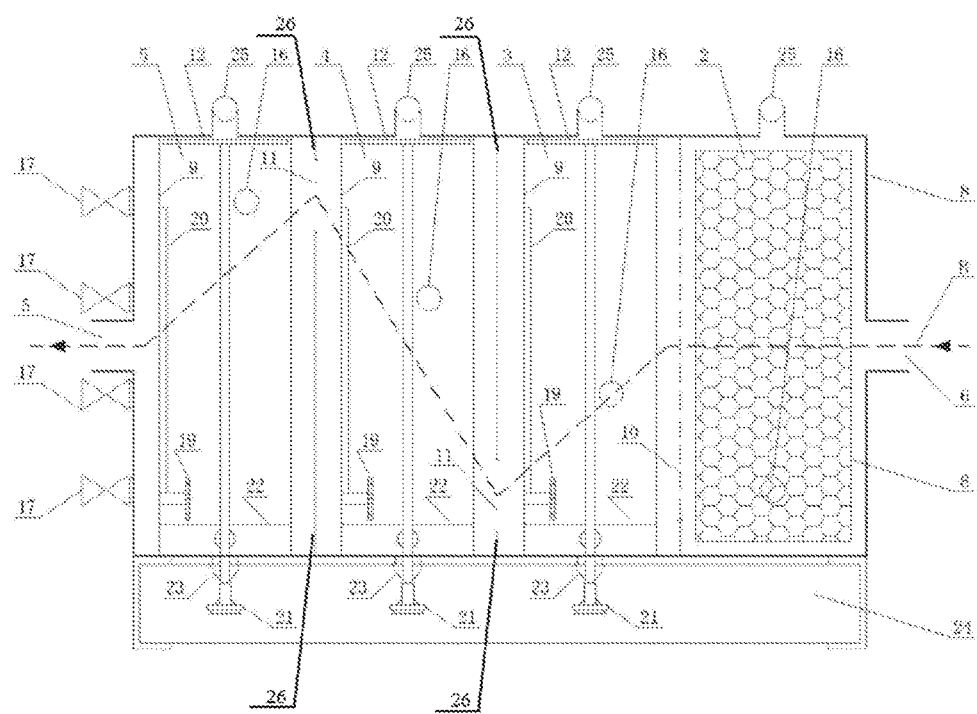
FIG. 2 is a planar structure diagram of a main body of the present disclosure.
Figure 3:
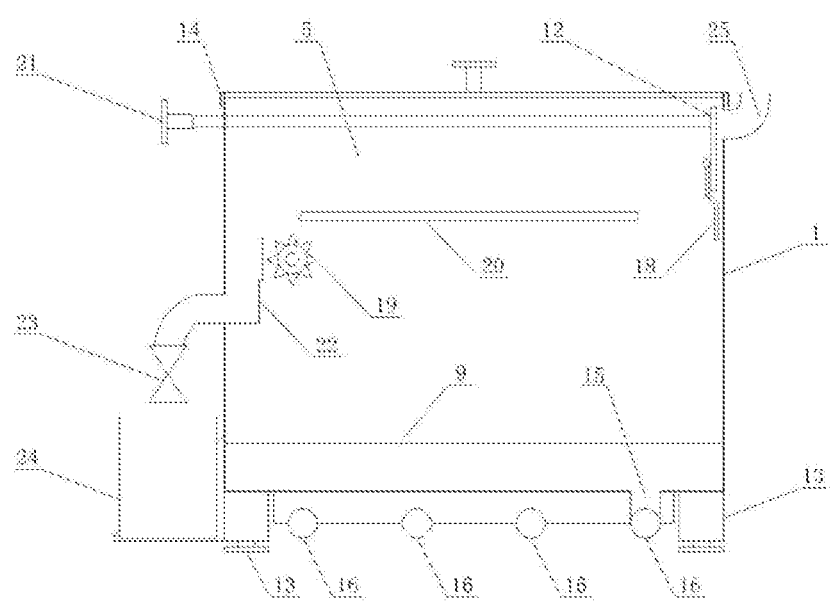
FIG. 3 is a laterally sectional structure diagram of a grease trap chamber of the present disclosure.
Figure 4:
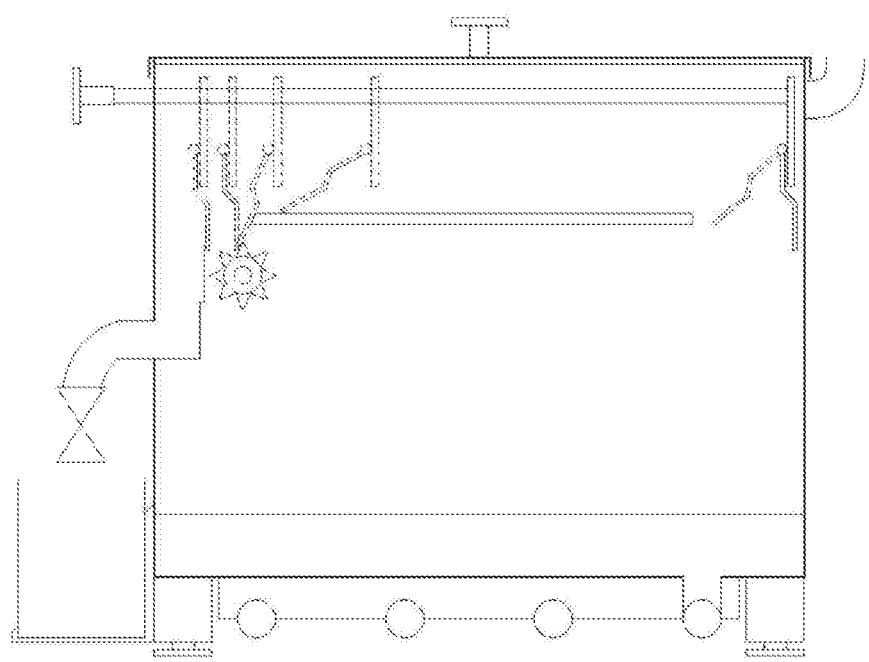
FIG. 4 is a schematic diagram of pushing a manually-operated grease scraper of the present disclosure.

As shown in FIGS. 1, 2 and 3, a residue and grease trap for catering wastewater is provided. The residue and grease trap for catering wastewater includes a grease trap main body 1. The grease trap main body 1 is divided into a residue trap chamber 2, a first grease trap chamber 3, a second grease trap chamber 4 and a third grease trap chamber 5. A wastewater inlet 6 is formed on the residue trap chamber 2 of the main body 1, and a water outlet 7 is formed on the third grease trap chamber 5 of the main body 1. A removable residue bucket 8 is provided within the residue trap chamber 2. Grease interceptors 9 are provided within the three grease trap chambers 3, 4 and 5. A residue separation mesh with water openings 10 is formed between the residue trap chamber 2 and the first grease trap chamber 3. Water outlets 11 are formed between the first grease trap chamber 3 and the second grease trap chamber 4 and between the second grease trap chamber 4 and the third grease trap chamber 5, respectively. A manually-operated grease scraper 12 is provided within each of the three grease trap chambers 3, 4 and 5. Adjustable legs 13 are provided at four corners of a pedestal of the main body 1. The main body 1 is provided with a removable main lid 14. Bottom residue discharge ports 15, which are connected to bottom residue discharge pipes 16 and residue discharge pipe valves 17 outside the chambers, are provided in the residue trap chamber 2 and the grease trap chambers 3, 4 and 5, respectively. Each of the manually-operated grease scrapers 12 includes a lower grease scraper plate 18, a unidirectional rotating gear 19, a bearing 20 and a pull handle 21. Grease buckets 22, which are connected to grease discharge pipe valves 23 outside the chambers, are provided in the three grease trap chambers 3, 4 and 5, respectively. The main body 1 is provided with a removable grease tank 24 located outside the grease trap chamber. An air vent 25 is formed on each of the residue trap chamber 2 and the grease trap chambers 3, 4 and 5.

Embodiment 2

As shown in FIGS. 1, 2, 3 and 4, a residue and grease trap for catering wastewater is provided. The residue and grease trap for catering wastewater includes a grease trap main body 1. The grease trap main body 1 is divided into a residue trap chamber 2, a first grease trap chamber 3, a second grease trap chamber 4 and a third grease trap chamber 5. A wastewater inlet 6 is formed on the residue trap chamber 2 of the main body 1, and a water outlet 7 is formed on the third grease trap chamber 5 of the main body 1. A removable residue bucket 8 is provided within the residue trap chamber 2. Grease interceptors 9 are provided within the three grease trap chambers 3, 4 and 5. A residue separation mesh with water openings 10 is formed between the residue trap chamber 2 and the first grease trap chamber 3. Water outlets 11 are formed between the first grease trap chamber 3 and the second grease trap chamber 4 and between the second grease trap chamber 4 and the third grease trap chamber 5, respectively. A manually-operated grease scraper 12 is provided within each of the three grease trap chambers 3, 4 and 5. Adjustable legs 13 are provided at four corners of a pedestal of the main body 1. The main body 1 is provided with a removable main lid 14. Bottom residue discharge ports 15, which are connected to bottom residue discharge pipes 16 and residue discharge pipe valves 17 outside the chambers, are provided in the residue trap chamber 2 and the grease trap chambers 3, 4 and 5, respectively. Each of the manually-operated grease scrapers 12 includes a lower grease scraper plate 18, a unidirectional rotating gear 19, a bearing 20 and a pull handle 21. Grease buckets 22, which are connected to grease discharge pipe valves 23 outside the chambers, are provided in the three grease trap chambers 3, 4 and 5, respectively. The main body 1 is provided with a removable grease tank 24 located outside the grease trap chamber. An air vent 25 is formed on each of the residue trap chamber 2 and the grease trap chambers 3, 4 and 5.

The present disclosure relates to a horizontal-flow grease trap with a residue separation function. The direction of the water flow in the main body 1 is shown by a stereoscopic schematic flow direction line A and a planar schematic flow direction line B. Before the mounting of the trap, it is necessary to adjust the legs 13 to allow the main body 1 to be horizontal. When the catering wastewater flows into the residue trap chamber 2 from the wastewater inlet 6, food residue in the wastewater is intercepted by the residue separation mesh with water openings 10 and then deposited in the removable residue bucket 8. The wastewater with food residue intercepted (containing few food residue particles leaked from the residue separation mesh with water openings 10) flows slowly and horizontally into the three grease trap chambers 3, 4 and 5 from the residue separation mesh with water openings 10 and the water outlets 11. The grease (containing some dirt having a specific gravity less than that of water) in the wastewater is intercepted, by the grease interceptors 9 in the grease trap chambers 3, 4 and 5, in water surface in the three grease trap chambers 3, 4 and 5 since it has a specific gravity less than that of water, and few food residue particles having a specific gravity greater than water are deposited on the bottoms of the three grease trap chambers 3, 4 and 5. In the grease separation order, most grease is intercepted in water surface in the first grease trap chamber 3, a little of grease is intercepted in water surface in the second grease trap chamber 4, and less remaining grease is intercepted in water surface in the third grease trap chamber 5. The wastewater which passed through grease-water separation and residue interception flows out from the main body 1 through the water outlet 7 of the third grease trap chamber 5, and is then discharged to a common wastewater sewer. When the amount of the food residue intercepted and deposited in the removable residue bucket 8 influences the normal operation of the trap or results in foul smell, the main lid 14 is taken off in the premise of discharging no wastewater into the trap, and the residue bucket 8 is removed to pour the food residue into a dedicated food residue trash can for subsequent processing. When the amount of the grease intercepted in water surface in the three grease trap chambers 3, 4 and 5 influences the normal operation of the trap or results in foul smell, the grease discharge pipe valves 23 outside the three grease trap chambers are opened in the premise of discharging no wastewater into the trap, and the pull handles 21 of the manually-operated grease scrapers 12 of the three grease trap chambers are pulled or pushed to remove grease in water surface. When each of the grease scrapers 12 is pulled, the lower grease scraper plate 18 is in water surface to remove grease in water surface; and, when the grease scraper 12 is pushed, the lower grease scraper plate 18 is above water surface due to the unidirectional rotating gear 19 and the bearing 20, to avoid the backflow of the grease in water surface and realize the better effect of removing grease in water surface. The grease is discharged into the removable grease tank 24 outside the chamber, through the grease buckets 22, which are connected to the grease discharge pipe valves 23 outside the chamber, of the three grease trap chambers; and the grease tank 24 is removed to pour grease into a dedicated grease bucket for subsequent processing. When the residue deposited on the bottom of the residue trap chamber 2 and the three grease trap chambers 3, 4 and 5 (few food residue particles leaked from the residue separation mesh with water openings 10 and the residue bucket) influence the normal operation of the trap or results in foul smell, in the premise that no wastewater is discharged into the trap and grease in water surface in the three grease trap chambers 3, 4 and 5 is completely removed, the residue discharge pipe valves 17 outside the residue trap chamber 2 and the three grease trap chambers 3, 4 and 5 are opened, and the residue in the chambers 2, 3, 4 and 5 is discharged out from the main body 1 through the bottom residue discharge ports 15 connected to the bottom residue discharge pipes 16 and the residue discharge pipe valves 17 and finally discharged into a common wastewater sewer. The air vents 25 function to discharge gas in the chambers 2, 3, 4 and 5 and ensure the normal removal of grease in water surface by the manually-operated grease scrapers 12 in the three grease trap chambers. The air vents 25 are connected to external air pipes.

What is claimed is:

1. A residue and grease trap chamber for catering wastewater, comprising
 a grease trap main body and a removable main lid, wherein the main body is divided into four chambers communicating one by one, being respectively a residue trap chamber, a first grease trap chamber, a second grease trap chamber and a third grease trap chamber,
 the residue trap chamber and the first grease trap chamber being separated and communicated by a residue separation mesh with water openings located in an upper portion of a spacer between the residue trap chamber and the first grease trap chamber, to allow the catering wastewater to pass through,
 the first grease trap chamber and the second grease trap chamber, the second grease trap chamber and the third grease trap chamber being respectively separated by a plurality of grease interceptors and a plurality of water guiding plates provided therebetween, to form a water pathway and allow the catering wastewater to flow from the first grease trap chamber to second grease trap chamber, and to the third grease trap chamber;
 a wastewater inlet is formed in the residue trap chamber of the main body, and a water outlet is formed in the third grease trap chamber of the main body;
 a removable residue bucket is provided within the residue trap chamber;
 a grease bucket is provided within each of the three grease trap chambers, and the grease bucket is connected to a removable grease tank outside each chamber through a grease discharge pipe and a grease discharge pipe valve;
 a residue discharge pipe is provided on the bottom of each of the residue trap chamber and the three grease trap chambers;
 an air vent is formed in each of the residue trap chamber and the three grease trap chambers;
 and
 the main body is provided with adjustable legs.

2. The residue and grease trap chamber for catering wastewater according to claim 1, wherein
 the grease buckets of the three grease trap chambers are connected to a grease discharge pipe outside a chamber, and provided with valves.

3. The residue and grease trap chamber for catering wastewater according to claim 1, wherein
 the residue discharge pipes on the bottom of each of the residue trap chamber and the three grease trap chambers are provided with valves.

4. The residue and grease trap chamber for catering wastewater according to claim 1, wherein
 the air vent formed on each of the residue trap chamber and the three grease trap chambers is located on the top of a wall of each of the chambers.

* * * * *